(12) United States Patent
Staub et al.

(10) Patent No.: US 7,820,269 B2
(45) Date of Patent: Oct. 26, 2010

(54) TRANSFER FILM

(75) Inventors: Rene Staub, Hagendorn (CH); Achim Hansen, Zug (CH); Juri Attner, Burgthann (DE)

(73) Assignee: OVD Kinegram AG, Zug (CH)

( * ) Notice: Subject to any disclaimer, the term of this patent is extended or adjusted under 35 U.S.C. 154(b) by 500 days.

(21) Appl. No.: 11/918,567

(22) PCT Filed: Apr. 11, 2006

(86) PCT No.: PCT/EP2006/003318
§ 371 (c)(1),
(2), (4) Date: Oct. 12, 2007

(87) PCT Pub. No.: WO2006/108607
PCT Pub. Date: Oct. 19, 2006

(65) Prior Publication Data
US 2009/0061159 A1 Mar. 5, 2009

(30) Foreign Application Priority Data
Apr. 13, 2005 (DE) ...................... 10 2005 017 169

(51) Int. Cl.
*B32B 3/00* (2006.01)
*B32B 15/00* (2006.01)

(52) U.S. Cl. ............... 428/156; 428/161; 428/162; 428/164; 428/195.1; 428/209; 428/916

(58) Field of Classification Search .............. 428/156, 428/161, 162, 164, 195.1, 209, 916; 283/72, 283/91, 100; 359/558, 563, 576, 572, 575; 430/10
See application file for complete search history.

(56) References Cited

U.S. PATENT DOCUMENTS

| 2,587,594 | A | 3/1952 | Chavannes et al. |
| 3,351,510 | A | 11/1967 | Harris |
| 3,790,245 | A | 2/1974 | Hannan et al. |
| 4,629,647 | A | 12/1986 | Sander |

(Continued)

FOREIGN PATENT DOCUMENTS

CA 2506838 6/2004

(Continued)

*Primary Examiner*—David R Sample
*Assistant Examiner*—Catherine Simone
(74) *Attorney, Agent, or Firm*—Hoffmann & Baron, LLP (57) ABSTRACT

Described is a transfer film, in particular a hot embossing film, which includes a carrier film (22) and a transfer layer portion having a structure layer (14), the transfer layer portion being arranged on the carrier film (22) and being detachable from the carrier film (22). It is provided that the carrier film (22) has a master relief structure (22*m*) on its side towards the structure layer (14), the structure layer (14) on its side towards the carrier film (22) has a first relief structure (14*o*) complementary to the master relief structure (22*m*) of the carrier film (22), the structure layer (14) on its side remote from the carrier film (22) has a second relief structure (14*u*) which differs from the first relief structure (14*o*), and the second relief structure (14*u*) is covered at least region-wise with a reflection layer (16). There are further provided a process for the production of the transfer film, a multi-layer body formed with the structure layer and a security document having the multi-layer body.

20 Claims, 5 Drawing Sheets

U.S. PATENT DOCUMENTS

| | | |
|---|---|---|
| 5,344,681 A | 9/1994 | Calhoun et al. |
| 5,411,296 A | 5/1995 | Mallik |
| 6,060,143 A | 5/2000 | Tompkin et al. |
| 6,369,947 B1 | 4/2002 | Staub et al. |
| 6,906,861 B2 | 6/2005 | Tompkin et al. |
| 7,002,746 B2 | 2/2006 | Schilling et al. |
| 7,227,690 B2 | 6/2007 | Schilling et al. |
| 2003/0058491 A1 | 3/2003 | Holmes et al. |
| 2004/0008390 A1 | 1/2004 | Hsiao |
| 2005/0082819 A1 | 4/2005 | Tompkin et al. |

FOREIGN PATENT DOCUMENTS

| | | |
|---|---|---|
| DE | 2350109 | 4/1974 |
| DE | 3337458 | 4/1985 |
| DE | 3422908 | 4/1986 |
| DE | 69227117 | 5/1999 |
| DE | 10216561 | 10/2003 |
| DE | 10054503 | 2/2005 |
| DE | 10254499 | 12/2005 |
| DE | 10254500 | 3/2006 |
| EP | 0064782 | 11/1982 |
| EP | 1182054 | 2/2002 |
| EP | 1182055 | 2/2002 |
| EP | 0992020 | 3/2003 |
| WO | WO 98/26373 | 6/1998 |
| WO | WO 03/082598 | 10/2003 |
| WO | WO 03/084764 | 10/2003 |

TRANSFER FILM

This application claims priority based on an International Application filed under the Patent Cooperation Treaty, PCT/EP2006/003318, filed on Apr. 11, 2006 and German Application No. 102005017169.9, filed on Apr. 13, 2005.

BACKGROUND OF THE INVENTION

The invention concerns a transfer film, in particular a hot embossing film, which includes a carrier film and a transfer layer portion having a transparent structure layer, the transfer layer portion being arranged on the carrier film and being detachable from the carrier film, a process for the production of such a transfer film and a multi-layer body.

For protecting documents such as for example identity papers, bank notes or credit cards, it is known to use hot embossing films or laminating films with a carrier which can be pulled off, as security elements. The films include layers with diffractive features, combined with metallic and/or dielectric reflection layers. After the security element has been applied to a substrate there is substantially a smooth reflective surface. Such security elements have optical features which are embedded in the security element.

EP 1 182 054 A2 discloses an embedded structure layer which is provided on both sides with relief structures which by virtue of their co-operation form optical effects. The structure layer is of a layer thickness of up to 200 µm. Arranged on both sides of the film to be embossed are two embossing cylinders which mutually serve as pressure backing cylinders in order to produce an adequate embossing pressure. The great layer thickness means that there is no fear of the two relief structures influencing each other during manufacture. It is preferably provided that a temperature-resistant carrier film, for example of polyester, is coated on both sides with lacquer and the two lacquer layers are embossed.

SUMMARY OF THE INVENTION

Now the object of the invention is to provide an inexpensive process which is suitable for mass production for producing a multi-layer body with a transparent structure layer which is structured on both sides, and a multi-layer body produced with that process.

The object of the invention is attained by a transfer film, in particular a hot embossing film, which includes a carrier film and a transfer layer portion having a structure layer, the transfer layer portion being arranged on the carrier film and being detachable from the carrier film, wherein it is provided that the carrier film has a master relief structure on its side towards the structure layer, the structure layer on its side towards the carrier film has a first relief structure complementary to the master relief structure of the carrier film, the structure layer on its side remote from the carrier film has a second relief structure which differs from the first relief structure, and the second relief structure is covered at least region-wise with a reflection layer.

The object of the invention is further attained by a process for the production of a transfer film which includes a carrier film and a transfer layer portion having a structure layer, the transfer layer portion being arranged on the carrier film and being detachable from the carrier film, wherein it is provided that a master relief structure is introduced into the carrier film and/or a master relief structure is applied to the carrier film, that the structure layer is applied to the carrier film, wherein a first relief structure complementary to the master relief structure of the carrier film is shaped into the structure layer, the first relief structure is optionally fixed by hardening of the structure layer, a second relief structure which differs from the first relief structure is shaped into the structure layer, and a reflection layer is applied at least region-wise to the second relief structure.

Furthermore the object of the invention is attained by a multi-layer body comprising a structure layer, wherein the structure layer forms the front side of the multi-layer body and a first relief structure is shaped into a first surface of the structure layer, which forms the front side of the multi-layer body, wherein it is provided that a second relief structure is shaped into a second surface in opposite relationship to the first surface of the structure layer, the second relief structure is different from the relief structure, the second relief structure is covered at least region-wise by a reflection layer, and the structure layer is of a thickness of <10 µm, preferably a thickness of <5 µm, between the central levels of the two relief structures.

In that case the first and the second relief structures can be different on the one hand by virtue of the formation of different relief structures in respect of their pattern, profile depth, spatial frequency, period, surface profile, preferred direction and so forth. The first and the second relief structures however can also be entirely or substantially identical and can merely be arranged displaced relative to each other in the plane so that for example a trough or a depression in the first relief structure does not coincide with a trough in the second relief structure but with a peak in the second relief structure. The same pattern regions of the first and second relief structures are therefore not disposed in mutually superposed perpendicular relationship but are in mutually displaced relationship. In that case the first and the second relief structures can be displaced relative to each other only by a fraction or by a multiple of a period. The first and the second relief structures can also be arranged alternately so that, in a region in which the first relief structure is disposed, the second relief structure is not arranged in perpendicular relationship with respect thereto and vice-versa. In addition the first and the second relief structures can be arranged in overlapping relationship or can only overlap in region-wise manner. In addition the first and the second relief structures can have mutually supplemental patterns or representations.

In addition the object of the invention is attained by a security document having a multi-layer body as set forth hereinbefore.

The invention makes it possible to produce structure layers with relief structures which are shaped on both sides therein of a very small layer thickness without mutual influencing of the two relief structures during the production procedure. The carrier film with the master relief structure provides on the one hand for adequate mechanical stability for shaping the second relief structure and on the other hand protects the first relief structure during the shaping procedure for the second relief structure.

In that respect the thickness of the structure layer can be so reduced that it does not stick up when applied to a security document and is not damaged in use, for example by folding loadings. Furthermore the small thickness of the structure layer affords a higher level of safeguard against forgery for the thin structure layer cannot be detached again from an article or document to be protected, without being destroyed. In addition novel optical effects can be generated by virtue of the small distance between the two relief structures.

In that respect it is in particular possible for the first relief structure and the second relief structure when viewed in cross-section to engage into each other or to be in mutually meshing relationship.

The process according to the invention provides that the relief structures produced on the two sides of the structure layer can be produced independently of each other, in which case the relief structure can be designed exclusively in accordance with functional criteria. In addition it is possible to use apparatuses and process steps which have been tried and tested in practice and which are suitable for mass production, and for the structure layer to be provided with relief structures on both sides in a roll-to-roll procedure.

Because the first relief structure is arranged at the surface of the multi-layer body a security feature which is represented by the multi-layer body can also be detected by tactile means. It can thus also be felt by visually impaired people and cannot be imitated by a conventional copying or printing process.

The structure layer can preferably be a transparent structure layer. The structure layer however can also be only partially transparent and can include for example colored regions or can involve opaque printing. Advantageously such partial regions of the structure layer are in register relationship with the first and/or second relief structure.

Further advantageous configurations are recited in the appendant claims.

The structure layer can be of a thickness of <10 μm, preferably a thickness of <5 μm, between the central levels of the two relief structures.

It can be provided the master relief structure is formed by embossing in the carrier film. It is possible to provide embossing processes which are used in the production of film bodies. If the carrier film is a thermoplastic carrier film the master relief structure can be introduced by a thermal embossing process using an embossing roller under pressure and temperature. A carrier film which is embossed in that way is sufficiently stable to prevent deformation of the carrier structure in the operation of hot embossing of the second relief structure.

It can however also be provided that the carrier film has a layer in which the master relief structure is shaped. It can be provided for example that a thermoplastic replication lacquer layer is applied to the carrier film, the lacquer layer is dried and thereafter the master relief structure is shaped into that lacquer layer.

It can further be provided that UV-hardenable replication lacquer is applied to the carrier film and the master relief structure is introduced during the application procedure using an embossing roller. The UV source required for hardening the UV lacquer can be arranged either in a transparent embossing roller or under the carrier film. In a modified embodiment it can be provided that the master relief structure is shaped by partial irradiation of the UV-hardenable replication lacquer layer of the carrier film and the regions which are not hardened are then removed by washing.

To form the structure layer it can be provided that a thermoplastic replication lacquer is applied to the carrier film and the first relief structure is shaped in that fashion. After drying of the lacquer the second relief structure can be shaped by means of a heated embossing roller.

It can further be provided that a UV-hardenable lacquer is applied to the carrier film and the lacquer is hardened during the operation of shaping the second relief structure by UV light. That cold embossing process is distinguished by a high level of imaging quality for the first relief structure because the UV-hardenable lacquer can be adapted to be particularly fluid and thus can completely fill very small cavities in the master relief structure. It is advantageous that UV-hardenable lacquer produces a layer which is particularly stable in respect of temperature. It can therefore also be provided that the structure layer is formed by two layers, wherein advantageously the first layer can be formed from UV-hardenable lacquer and the second layer from thermoplastic lacquer. Both layers should advantageously involve the same optical refractive index so that the layer structure is optically not perceptible.

In a further advantageous configuration it can be provided that the carrier film has partial printing. The partial printing can be particularly advantageous for particularly easily producing master relief structures with a low depth-to-width ratio. Further effects can be achieved if for example the carrier film has a rough surface and the printing lacquer after drying has a smooth surface, or vice-versa. The properties of the printing lacquer can be determined for example by its proportion of solids. The thickness of the layer which is applied by printing can be set to be different, for example between 2 μm and 5 μm. The partial printing can also be provided supplemental to the above-described embossing of the master relief structure, for example in order to personalize the master relief structure. Preferably a printing process which is controllable by software can be provided for that purpose. In that way inexpensive personalization of the structure layer can be implemented even for small numbers of items.

The layer which is applied by printing can be a colored layer and/or a nanoparticle-containing layer.

It can be provided that a release layer is arranged between the carrier film and the transfer layer portion. The release layer can be provided if the material pairing adopted for the carrier film and the structure layer causes difficulty with detachment of the carrier film or makes that impossible. The release layer can remain on the carrier film or on the transfer layer portion after release.

It can further be provided that a protective layer is arranged on the first relief structure of the structure layer. It can also be provided that the structure layer acts as a protective layer.

The reflection layer can be in the form of a metallic layer and/or dielectric layer or layer sequence. The dielectric layer can be a layer with a lower optical refractive index than the structure layer so that total reflection can be produced at the interface layer between the structure layer and the dielectric layer. It can however also involve a layer sequence of HRI layers (high refraction index) and LRI layers (low refraction index). Thin films of that kind can produce pronounced changing color impressions. Regions disposed under the dielectric layer can therefore be visible with a suitable viewing direction for total reflection occurs in dependence on the refractive index of the structure layer and dielectric layer and the angle of incidence of the light.

The first relief structure can be a relief structure which can be detected by tactile means. With such a structure the raised portions can be arranged at such a spacing that at least two adjacent nerve ends of the human skin are stimulated. The relief structure can also such that sound vibrations are provoked in a body which is brought into moving contact with the first relief structure, for example when scraping a fingernail thereover.

It can further be provided that the first relief structure can be recognized by optical means. The first relief structure can be of such a nature that it can be detected both by optical and also tactile means.

The first and/or the second relief structure are preferably non-random relief structures. The term non-random relief structure is used to denote such a structure which is specifically and targetedly formed and which does not occur by virtue of random surface roughnesses of material surfaces. Thus non-random relief structures can be recognized in particular by virtue of the fact that they are specifically reproducible.

If for example a relief structure with a desired profile shape is produced for example on an industrial scale in an endless carrier film a suitably structured stamp, cylinder or the like which is of finite length is usually employed for that purpose. By virtue of the continuous use of the structured tool on the endless carrier film the shaped relief structures are repeated on the carrier film at regular spacings and are thus perceptibly non-random relief structures, even if at first glance a random relief structure appears locally to be present.

A non-random relief structure can also be recognized for example by virtue of the fact that given profile shapes which usually are not encountered or which are only very rarely encountered occur frequently, periodically or quasi-periodically. While a profile shape which is rather undefined and rounded is to be expected from a random relief structure such as a surface roughness, non-random relief structures present for example exact and geometrically formed profile shapes such as rectangular profiles, sawtooth profiles, hemispherical profiles, blaze structures or the like. In addition non-random relief structures present for example profiles with a profile depth which is of a staggered step-like configuration, of a constant profile depth like in particular the binary profiles described in DE 100 54 503 B4, and so forth.

A specific case of a step-like profile is for example a rectangular profile, in which case the local profile depths can only assume discrete levels. In that case the spacings between two adjacent depressions are preferably in the range of between 0.5 and 50 μm. The profile depth, in relation to a central level, is preferably <5 μm.

Microscopically fine, non-random relief structures with a locally varying structure depth are disclosed for example in EP 992 020 B1.

It has proven desirable if the first relief structure and/or the second relief structure includes a microstructure, the dimensions of which are below the limit of resolution of the human eye.

The first relief structure and/or the second relief structure can generally be in the form of a microstructure, the dimensions of which are below the resolution limit of the human eye, and/or in the form of a macrostructure which is visible to the human eye. In that case a macrostructure can be present beside a microstructure and/or can be superposed by a microstructure. In that case a microstructure can have an optical effect which simulates the presence of a macrostructure.

The first relief structure and/or the second relief structure can be in the form of a matt structure and/or in the form of a diffractive structure and/or in the form of a refractive structure and/or in the form of a macrostructure.

The matt structure is a diffractive structure of a stochastic configuration so that incident light is randomly scattered. On a microscopic scale matt structures have fine relief structure elements which determine the scatter capability and which can be described with statistical parameters such as for example the mean roughness value Ra, correlation length Ic and so forth. Preferred matt structures involve a mean roughness value Ra in the range of between 20 nm and 2000 nm, preferably in the range of between 50 nm and 500 nm. The correlation length Ic is preferably in the range of between 200 nm and 50000 nm, in particular in the range of between 500 nm and 10000 nm.

Diffractive structures are structures which produce optical effects based on light diffraction, for example diffraction gratings or holograms. That can involve classic 2D/3D or 3D holograms which, based on a surface structure, permit the representation of three-dimensional information. Considered locally the profile of a holographically generated hologram such as for example a Fourier hologram can be considered as being approximately periodic, in which case typical numbers of lines are in the range of between 300 and 2000 l/mm and typical structure depths are in the range of between 50 and 800 nm.

A computer-generated hologram such as for example what is referred to as a kinoform can arouse the impression of a stochastic surface relief and can have an asymmetrical diffraction effect. A typical structure depth is half or a multiple of the wavelength of the incident light and depends on whether the kinoform is to produce its effect in a transmission or a reflection mode.

The relief structure can be for example in the form of a linear grating or in the form of a cross grating, that is to say extend in a plane defined by x-y-co-ordinates in the x and/or y direction. The relief structure can also be a structure which extends in three directions for example a hexagonal grating.

The refractive structures are structures which produce optical effects based on refraction of light, for example microlenses. Microlenses of that kind are usually not employed individually but arranged in a regular raster grid in mutually juxtaposed relationship. It can preferably be provided that the diameter of the microlenses is between 3 μm and 80 μm, further preferably between 5 μm and 50 μm.

Those structures are generally of dimensions which are below the resolution limit of the human eye.

The macrostructures are structures, the dimensions of which can be perceived by the human eye, for example design elements, which are formed by structure regions.

Such macrostructures can be produced for example by lens elements or especially shaped relief structures which have an optical-diffraction effect and which produce a visible lens-like effect, such as in particular relief structures in accordance with DE 102 54 499 B4 or DE 102 54 500 B4. In that case the macroscopically visible structure is essentially simulated by means of relief structures which have an optical-diffraction effect and which cannot be resolved by the eye. In addition a macrostructure can be designed in accordance with DE 102 16 561 A1, which is a function that is at least portion-wise steady and differentiatable, which is curved at least in partial regions, and the adjacent extreme values of which are spaced at least 0.1 mm from each other.

Macrostructures which are superposed with a microstructure are to be found for example in WO 03/084764 A2. Described there is a diffraction structure which is formed by additive or subtractive superpositioning of a macroscopic structure with a microscopically fine relief profile.

Advantageous configurations provide that the first relief structure is produced with an anti-reflection effect and/or as a diffuser and/or is adapted to be dirt-repellent. To produce a dirt-repellent first relief structure it can further be provided that the structure layer is hydrophobic.

It can be provided that the width or grating period of the complementary first relief structure is less than the light wavelength if this involves an optically active relief structure for dereflection of a surface. For the range of visible light, having regard to the maximum spectral sensitivity of the human eye, for the wavelength $\lambda=555$ nm, that means that the grating period b must be <550 nm. The minimum depth of the relief structure, that is necessary for good dereflection, must be at least in the order of magnitude of half a wavelength, that is to say t>275 nm.

A dirt-repellent first relief structure is formed by being produced on hydrophobic material and by the grating period being selected to be less than the mean dimensions of the particles of dirt. Fine particles of dirt which are of dimensions of the order of magnitude of between 2 and 5 μm are bound by drops of water which roll down, and are thus removed from the relief structure. In that respect the fine raised portions of the relief structure already have a hydrophobic effect because the water is unable to wet the relief structure, by virtue of the surface tension of the water.

It can be provided that the first relief structure and the second relief structure produce mutually independent optical effects. It can also be provided however that the first and second relief structures produce mutually dependent optical effects. Such a dependent optical effect can occur for example by the first relief structure and the second relief structure being formed in partial regions which considered jointly form an item of image information. That image information can be completely visible for example only in a restricted range in terms of angle of view so that an optical effect which is dependent on the angle of view is produced. A particularly advantageous feature is the arrangement, which is registered at least in one direction, of the first and second relief structures which in turn can be registered in relation to a printing which is integrated into the transfer layer portion, or in relation to a coloring.

As already stated hereinbefore the structure layer can be produced and structured with available processes which have been tried and tested in practice.

It can therefore be provided that a release layer and/or a protective layer is or are applied to the carrier film prior to the application of the structure layer. In that respect it is to be noted that the release layer which is additionally applied to the master relief structure can influence the production of the first relief structure. The master relief structure therefore possibly has to be reduced by the thickness of the additionally applied release layer.

The structure layer can be formed from a first and a second layer of approximately the same refractive index, in which respect it is provided that the second layer is applied to the hardened first layer which is provided with the first relief structure, and the second relief structure is shaped into the second layer. As already explained hereinbefore the first layer can advantageously be formed from a radiation-hardenable lacquer and the second layer from a thermoplastic lacquer. The choice of material is determined inter alia by the desired function such as for example scratch-resistant, solvent-resistant, dirt-repellent and so forth.

A further advantageous configuration provides that an adhesive layer is applied, which covers the reflection layer and the second relief structure. The adhesive layer therefore covers the structure layer over the full surface area involved, irrespective of the fashion in which the structure layer and the reflection layer are formed. The adhesive layer can preferably be a hot adhesive. Cold adhesives, pressure-sensitive adhesives and UV-hardenable adhesives can be provided as further adhesives.

A multi-layer body produced with the structure layer according to the invention can be formed with a partially leveled off or flattened relief structure, for example to personalize it.

It can further be provided that the first relief structure of the multi-layer body is partially overprinted.

In a further embodiment it is provided that the first relief structure of the multi-layer body has a region which can be detected by touch. That region can already be provided in the first relief structure, but it can also be produced subsequently by partial removal or flattening and/or by overprinting.

It can further be provided that the region which can be detected by touch is arranged in register relationship with a structure arranged therebeneath, for example an optically effective diffractive structure.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
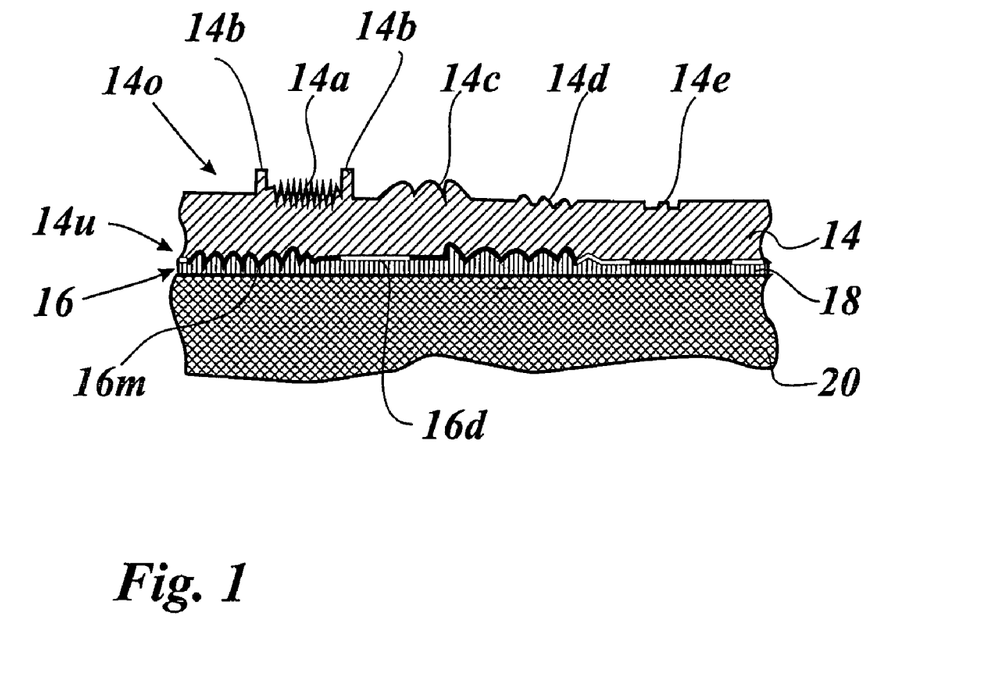
FIG. 1 is a diagrammatic view in section of a multi-layer body according to the invention applied to a carrier substrate.

FIG. 1 shows a multi-layer body 1 which is formed from a transparent structure layer 14, a reflection layer 16 and an adhesive layer 18. The adhesive layer 18 joins the multi-layer body 1 to a carrier body 20. The carrier body 20 can be for example a security document such as a pass or passport, an identity card or a credit card. The multi-layer body 1 can also be intended as a security feature for articles.

The transparent structure layer 14, on its upper side remote from the adhesive layer 18, has a first relief structure 14o while on its lower side towards the adhesive layer 18 it has a second relief structure 14u.

In the FIG. 1 embodiment, formed in the first relief structure 14o are regions 14a, 14b, 14c, 14d and 14e which differ from each other in terms of their structuring.

The region 14a is a region with a very fine grating structure having a grating constant of <0.4 μm and of a depth of >0.2 μm, which does not involve any diffraction orders in the visible range and with perpendicular illumination apart from the mirror reflection. With a suitable configuration such a structure can act as dereflection of the surface. That dereflection can be provided in order to produce regions with a differing brightness when viewed in mirror reflection or in order for example to improve color saturation of a thin film arrangement disposed under the region. Reflection of the order of magnitude of 0.5% can be implemented. In the case of a smooth surface which is provided instead thereof, reflection of the order of magnitude of between 4 and 5% is to be recorded, which diminishes the color saturation perceived by the viewer and impairs verification of the thin film arrangement by way of a color change upon being tilted. If a structure of that kind is applied only in partial regions, for example in accordance with a text, that information becomes perceptible when viewed in the mirror reflection mode while it is scarcely noticeable under usual viewing conditions. Dereflection in combination with a reflection layer which is partially metallized in a filigree pattern and which includes predominantly transparent regions becomes particularly advantageous. The reflection of the applied film element, which is usually a nuisance in that situation, is very substantially suppressed by the dereflection effect.

Partial concealment of the reflection from the surface of the structure layer 14 can also be achieved by slight matting of the first relief structure 14o. In that way the degree of shine of the first relief structure 14o can be specifically reduced, in which case transmitted light is scattered only slightly so that the items of information disposed under the structure layer 14 are clearly recognizable.

It can also be provided that the regions 14a are arranged in a grid raster and that the reflection capability of the regions 14a therein is varied. In that way it is possible to make use of the differing reflection of the raster elements to afford a graphic representation.

The relief structure in the region 14a can also have a dirt-repellent effect if the structure layer 14 is made from a hydrophobic material. Because of the high depth-to-width ratio and the low grating constant of the relief structure in the region 14a the particles of dirt which are relatively large in size do not cling to the surface of the relief structure and are bound by drops of water and removed from the surface. The depth-to-width ratio is a dimension-less number for characterizing preferably periodic structures which have "peaks" and "troughs". Depth denotes the height of a "peak" or the depth of a "trough", while width denotes the spacing between two adjacent "peaks". The self-cleaning effect of the structure layer 14 in the region 14a can permanently improve readability of items of information under the region 14a.

The regions 14b are provided as spacers which are intended to prevent or at least reduce soiling or scratching of the region 14a. If the region 14a is a region of larger area regions 14b can be disposed not only at the edges of the region but also within the region 14a, preferably distributed at regular spacings.

The region 14c affords the visual impression of a macroscopic surface relief although it has a maximum structure depth of only some micrometers. Such structures are usually embedded in layers. The macroscopic surface relief is visible in reflected light but does not impair recognizability of items of information applied to the carrier substrate 20 or reflecting structures formed in the first surface region 14u.

The region 14d is a diffractive structure, for example a Fourier hologram, which can be provided to represent a concealed item of information upon illuminated with a laser on a screen. The diffractive structure in the region 14d only slightly changes the optical effect of structures disposed thereebeneath.

The region 14e is provided with a surface relief whose raised portions and depressions are of such small dimensions that they are not perceptible without optical aids. Such structures are usually embedded in lacquer layers. The surface relief can be perceived with a magnifying glass or with a microscope and represents for example microscopically fine text or image information.

It can further be provided that the relief structure 14o at least partially has a reflection layer which can be for example in the form of a metallic or dielectric layer or a sequence of thin metal layers and/or dielectric layers. Such an additional reflection layer can be applied for example by vapor deposition before the structure layer 14 is shaped. Partial production of the reflection layer in register relationship with regions of the relief structure 14o can be provided to particular advantage.

The second relief structure 14u is formed with a surface relief which can include diffractive structures such as a hologram or a Kinegram®. This can also involve individualized items of information, for example in the form of alphanumeric characters or a bar code.

FIGS. 2a through 2e now show production stages for the multi-layer body 1 shown in FIG. 1.

Figures 2A, 2B:
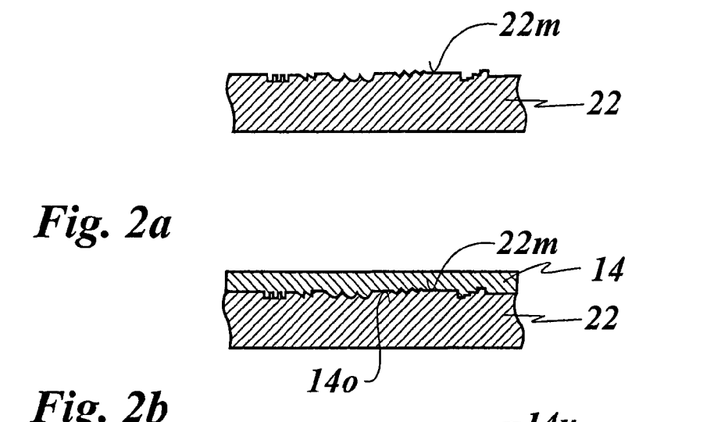
FIGS. 2a through 2e show diagrammatic views in section of production stages for the multi-layer body of FIG. 1.

FIG. 2a shows a carrier film 22 into which a master relief structure 22m is shaped, being of a complementary configuration to the first relief structure 14o (see FIG. 1). The carrier film 22 can be a polyester film or a polypropylene film or film of BOP, of a thickness of between 6 and 150 μm, preferably in the range of between 12 and 70 μm. The master relief structure 22m can be produced directly in the carrier film for example by hot embossing. For that purpose a heated embossing roller can be brought into contact with the carrier film.

A further configuration can provide that the carrier film 22 has a lacquer layer into which the master relief structure 22m is shaped. Particularly for producing especially fine master relief structures 22m as are required for dereflected surfaces, it can be provided that this involves a UV-hardenable lacquer into which the master relief structure 22m is introduced by UV replication. The UV-hardenable lacquer can be set to be particularly fluid so that it can completely fill even very small cavities in the embossing roller and can produce particularly deep structures. The UV-hardenable lacquer can be hardened directly by UV light which penetrates through the carrier film or the transparent embossing roller. The embossing roller however can also involve an optical embossing roller with which the master relief structure 22m is transferred by optical imaging, the UV lacquer is partially hardened and in a subsequent washing station unhardened UV lacquer is washed away.

The UV-hardenable lacquer can be for example one of the following lacquers: monomeric or oligomeric polyester acrylates, polyether acrylates, urethane acrylates or epoxy acrylates or amino-modified polyester acrylates, amino-modified polyether acrylates or amino-modified urethane acrylates.

It can however also be provided that the material is thermoplastic lacquer which is replicated by means of hot embossing under pressure and temperature. This can involve for example a lacquer of the following composition:

| Component | Parts by weight |
| --- | --- |
| Methyl ethyl ketone | 400 |
| Ethyl acetate | 260 |
| Butyl acetate | 160 |
| Polymethyl methacrylate (Softening point about 170° C.) | 150 |
| Styrene copolymer (Softening point about 100° C.) | 30 |

The lacquer is dried after the application operation and can then be replicated.

As the above-described examples clearly show the process according to the invention makes it possible to influence the properties of the master relief structure within wide limits, in which respect suitable process steps can be used for mass production.

Figures 2C, 2D:
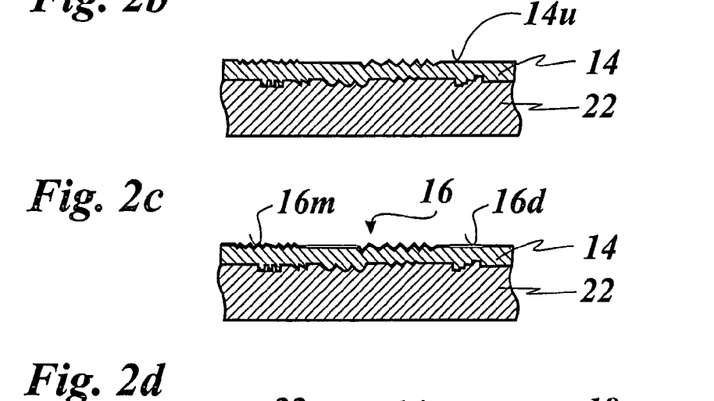

FIG. 2b now shows the replicated or printed carrier film 22 to which the transparent structure layer 14 is applied over the full surface area by printing, spraying or squeegee application. The structure layer 14 can be applied in the form of a thermoplastic lacquer or a UV-hardenable lacquer or a sequence of layers (which in part can also be present only in partial regions), of a layer thickness of between 0.5 μm and 10 μm, by means of a printing roller. Thermoplastic lacquer can be subjected to hot embossing after the drying operation, as shown in FIG. 2c. When using UV-hardenable lacquer it can be provided that the production stage shown in FIG. 2c is implemented immediately upon application of the structure layer 14 and the lacquer is hardened by UV radiation.

The first relief structure 14o is now shaped in the structure layer 14, with the structure layer 14 completely filling the master relief structure 22m of the carrier film 22. In that respect the structure layer 14 does not have to be of a homogenous configuration but it can also involve an integrated print or contain fluorescent or colored partial regions or nanoparticles.

The second relief structure 14u is now shaped into the structure layer 14 (see FIG. 1) in the production stage shown in FIG. 2c. That production stage can be effected by hot embossing of the side of the structure layer 14, which is remote from the carrier film 22, or, as described hereinbefore, by cold embossing when applying the structure layer 14 to the carrier film 22.

It can however also be provided that the structure layer 14 is formed from a first and a second layer, with the first layer being produced with the relief structure 14o and the second layer with the relief structure 14u. In that case the second layer is applied to the hardened first layer, embossed and hardened. The multi-layer configuration of the structure layer can be provided in order to optimize the material composition and the formation of the relief structure. It is preferably provided that the first and second layers are produced with approximately the same refractive index so that the structure layer 14 is optically in the form of a homogenous layer.

FIG. 2d now shows the fourth production stage in which a reflection layer 16 is applied to the second relief structure 14u. The reflection layer 16 can be for example in the form of a partial metallic layer 16m comprising a metal which has good reflecting properties such as gold, silver, aluminum or copper. In the example shown in FIG. 2d the non-metallic regions of the reflection layer 16 are filled with a dielectric layer 16d.

The regions of the reflection layer 16 which are formed with the metallic layer 16m reflect incident light independently of the angle of view, but in contrast the regions of the reflection layer 16 which are provided with the dielectric layer 16d, in conjunction with the structure layer 14, can provide for total reflection which is dependent on the angle of view. This however can also involve a layer sequence of HRI layers (high refraction index) and LRI layers (low refraction index). Thin films of that kind can produce excellent changing color impressions. This can also involve a sequence of dielectric thin layers involving different refractive indices or a sequence of metallic and dielectric layers. Layer packs of that kind can have clearly defined color changes by virtue of interference effects upon being tilted.

Figure 2E:
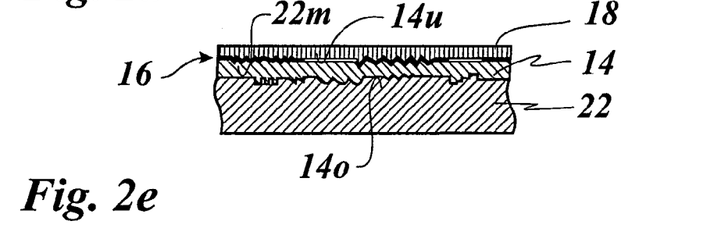

FIG. 2e shows the fifth and at the same time last production stage for the multi-layer body 1 of FIG. 1, which is applied to the carrier film 22, involving the application of an adhesive layer 18 to the reflection layer 14. The adhesive layer 18 can preferably be a melt adhesive.

It is possible for example to use an adhesive of the following composition.

| Component | Parts by weight |
| --- | --- |
| Methyl ethyl ketone | 550 |
| Ethyl acetate | 175 |
| Cyclohexanone | 50 |
| Polyurethane resin (Fp ≧ 200° C.) | 100 |
| Polyvinylchloride terpolymer (Tg = 90° C.) | 120 |
| Silicon dioxide | 5 |

Figure 2F:
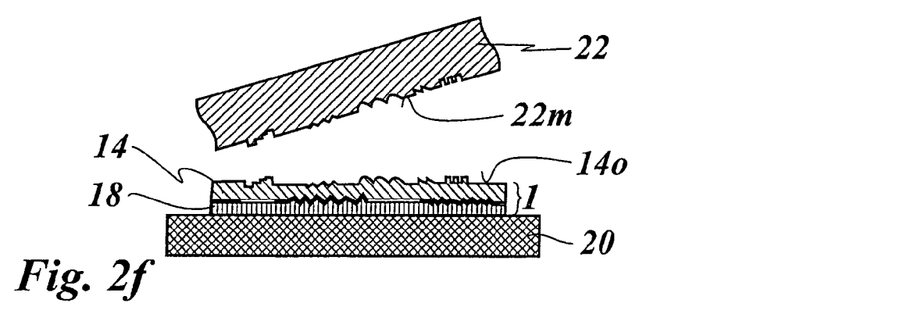
FIG. 2f shows the application of the multi-layer body of FIG. 2e to the carrier substrate.

FIG. 2f now shows the multi-layer body 1 which is applied to the carrier body 20 and from which the carrier film 22 is removed after application of the multi-layer body 1. The multi-layer body 1 and the carrier film 22 are turned through 180° relative to the position shown in FIGS. 2a through 2e so that the first relief structure 14o now forms the top of the multi-layer body 1, which is remote from the carrier body 20.

Detachability of the carrier film 22 from the multi-layer body 1 can be implemented by the material pairing of the carrier film 22 and the structure layer 14. It is however also possible to provide that disposed between the carrier film 22 and the structure layer 14 is a release layer which for example can be formed by a layer of wax. Preferably the release layer is an extremely thin layer, the thickness of which is only a few nm. If required the structure layer 14 can also be in the form of a protective layer, that is to say in the form of a particularly resistant layer or of a multi-layer configuration, with the uppermost sub-layer being in the form of the protective layer.

The above-described process is particularly well suited for a continuous roll-to-roll procedure in which the multi-layer body 1 is applied layer-wise to the carrier film 22 and structured.

Figure 3A:
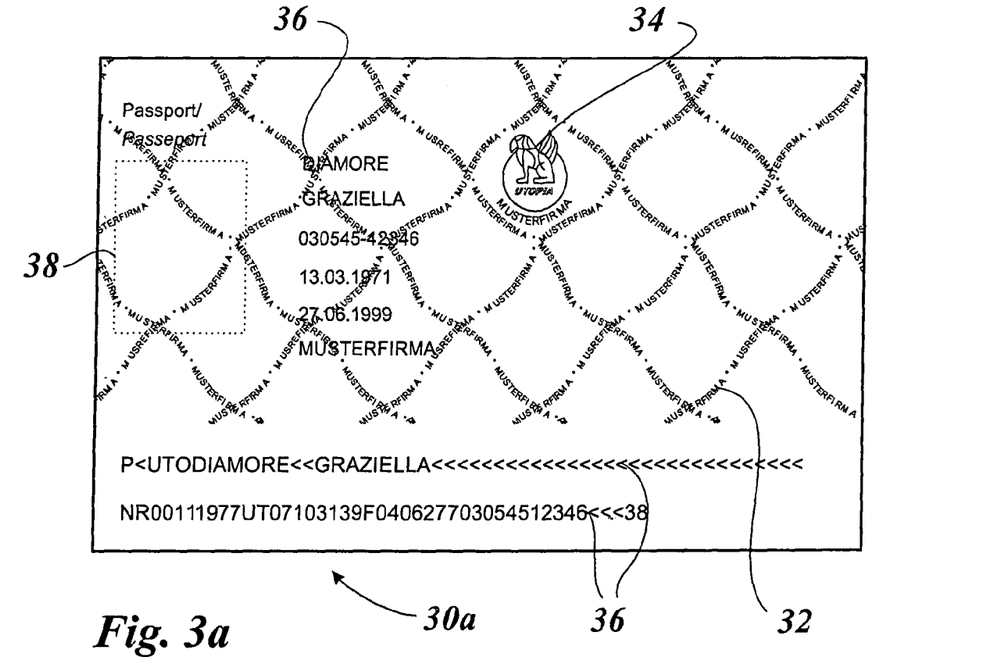
FIG. 3a shows a first example of application.

FIG. 3a now shows a first example of application. A transfer film is in the form of a lamination film for the protection of a pass or passport and comprises inter alia a multi-layer body 30a. The transfer film can include the following constituent parts or layers:
- a carrier film as described hereinbefore with reference to FIGS. 2a through 2f,
- the multi-layer body 30a whose external relief structure faces towards the carrier film,
- a heat-activatable adhesive layer, and
- optionally a second heat-activatable adhesive layer and a printed marking between the two heat-activatable adhesive layers.

In the example shown in FIG. 3a scattering regions 32 (see reference 14a in FIG. 1) are produced on the otherwise smooth surface of the multi-layer body 30a which is exposed after release of the carrier film. The scattering regions 32 reproduce in endless patterns a piece of text, in the illustrated example the text "MUSTERFIRMA". The readability of items of information therebeneath of the pass which is to be protected is not impaired by the scattering regions 32. It can be provided that regions 32 are produced with matt structures which have scattering properties to varying degrees so that colorless texts appear in different levels of brightness upon being tilted or turned.

The multi-layer body 30a further has a diffractive pattern 34 which in the illustrated example is in the form of a corporate logo. The diffractive pattern 34 can be shaped in the top side of the multi-layer body 30 but it can also be shaped in the underside of the multi-layer body and backed by a reflection layer.

Furthermore the multi-layer body 30a has personalized data 36 which can be in the form of diffractive reflecting regions in the underside of the multi-layer body 30a and which can be visible as colored regions on being tilted or turned. This can involve the same personalized data which, besides a passport photograph, the external contour 38 of which is shown in the form of a broken line in FIG. 3a, are applied by printing to the surface of the passport which is protected by the multi-layer body 30a. The data 36 can be arranged on the multi-layer body 30a in displaced relationship with respect to the data printed on the surface of the passport.

Figure 3B:
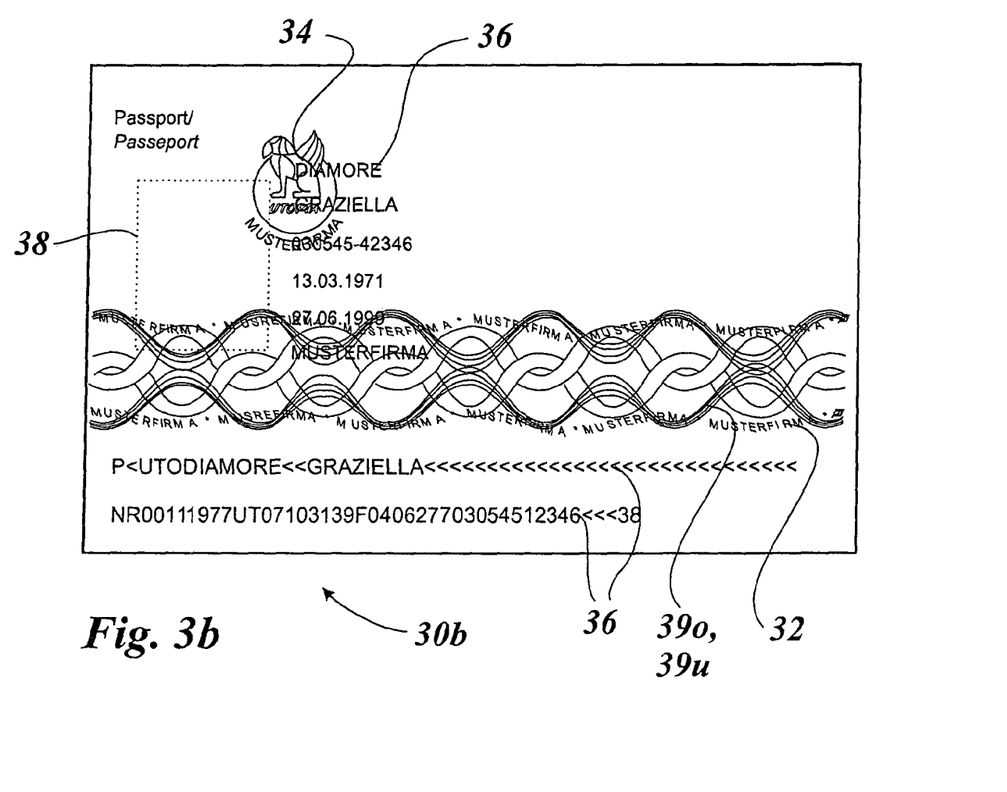
FIG. 3b shows a second example of application.

FIG. 3b now shows a second example of application. A multi-layer body 30b which in principle is like the multi-layer body 30a shown in FIG. 3a now additionally has fine grating structures 39o which are shaped in the top side of the multi-layer body 30b. It can advantageously be provided that the grating structures 39o are such that they light up from different viewing angles than grating structures 39u which are shaped at the underside of the multi-layer body 30b and which are backed with the reflection layer. For that purpose it can be provided for example that the grating structures 39u involve different grating constants and thus produce color effects which are dependent on the viewing angle.

Figure 4A:
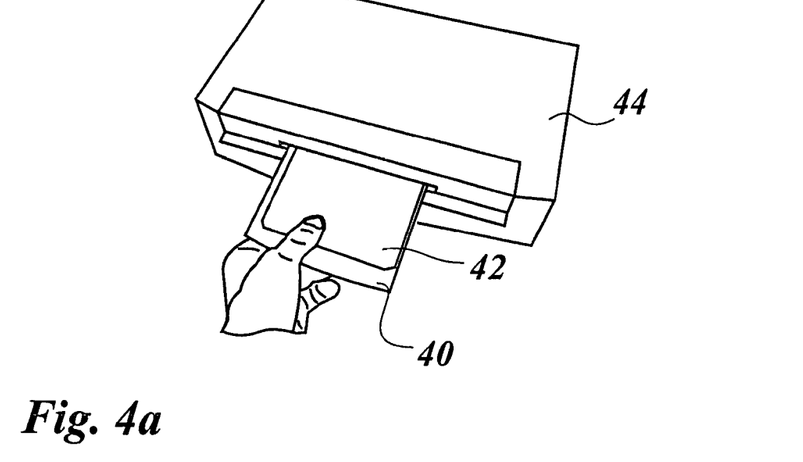
FIGS. 4a through 4c show a first embodiment for the application of the multi-layer body according to the invention.
Figure 4B:
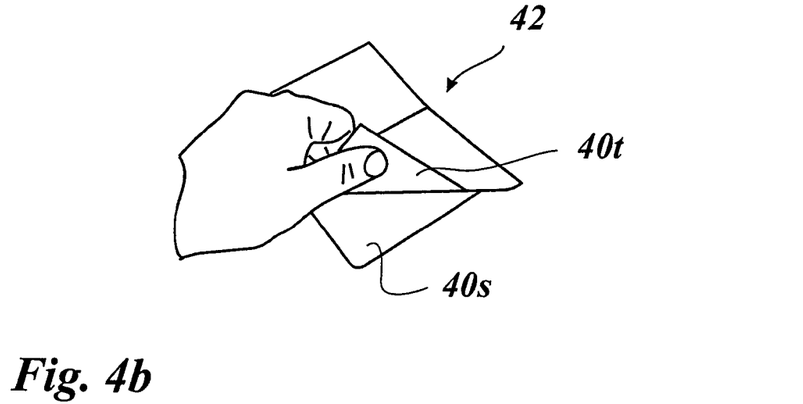
Figure 4C:
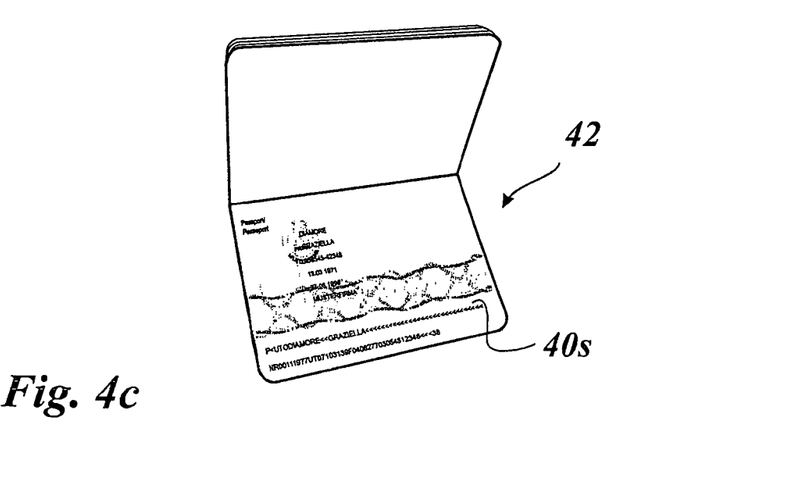

FIGS. 4a through 4c now show a first embodiment for application of the multi-layer body according to the invention, which for example can involve the above-described transfer films 30a (FIG. 3a) or 30b (FIG. 3b).

FIG. 4a shows a lamination film 40 for safeguarding an identity document 42, the film 40 being laid in the identity document 42 and introduced therewith into a laminating unit 44. In that fashion an adhesive layer applied at the underside of the lamination film 40 is heated and pressed onto the page of the pass document 42, which is to be safeguarded. As shown in FIG. 4b, besides the adhesive layer (not shown), the lamination film 40 has a carrier film 40t and a structure layer 40s provided with security features.

It can advantageously be provided that a region of the structure layer 40s is positioned over a hole or a watermark of the page of the pass document 42, which is to be safeguarded, so that the optical effect of the structure layer 40s can also be used in the transmission mode in order to achieve a desired visual effect.

FIG. 4b shows the pass document 42 which is laminated with the lamination film 40 and on the page of which that is to be safeguarded the structure layer 40s is applied and from which the carrier film 40t has already been partially removed.

FIG. 4c now shows the pass document 42 which is laminated with the structure layer 40s. The structure layer 40s which is provided with security features cannot be removed from the document 42 again without causing damage or destruction. The structure layer 40s has security features which cannot be imitated with copying processes.

It can be provided that after the lamination operation the carrier film 40t remains as a counterpart portion in the pass document 42 and forms an additional security feature. A transparent carrier film provided with a structured surface can be used as an optical verifier which produces a typical moiré effect when the laminated page of the pass document 42 is covered over.

It is also possible for the relief structure of the structure layer to be partially altered, for example to implement personalization. By way of example it is possible to provide partial overprinting with a covering lacquer in order in that way to apply individual alphanumeric characters and/or graphic representations.

It can further be provided that the action of the relief structure of the structure layer 40s can be locally removed by overprinting with a transparent or colored lacquer. In that case the refractive index of the lacquer is to differ from that of the uppermost layer of the structure layer 40s by less than 0.1. It can also be provided that the structure layer 40s is partially removed or leveled off, for example by means of a laser or a heated embossing tool, and in that way personalized data can be transferred onto the structure layer.

It can further be provided that regions of the structure layer 40s stand out from their surroundings in relation to tactile sensation or have a pattern which can be detected by touch. The regions can be felt by virtue of properties such as hardness, elasticity, the slip characteristic, thermal conductivity or stickiness or can have depressions or raised portions which can be detected by touch and which can form a pattern such as for example characters in braille or simple graphic logos such as for example squares, rhombuses, circles or stars. The regions can also be detectable by touch by being raised or recessed in relation to their surroundings. Furthermore the regions which can be detected by touch can be arranged in register relationship with optically effective structures of layers disposed therebeneath. The optical structures can be for example a diffraction grating, a hologram or a Kinegram®.

It can be provided that regions which have personalized data can also be detected by touch, for example at least the most important data are also represented in braille.

Figure 5:
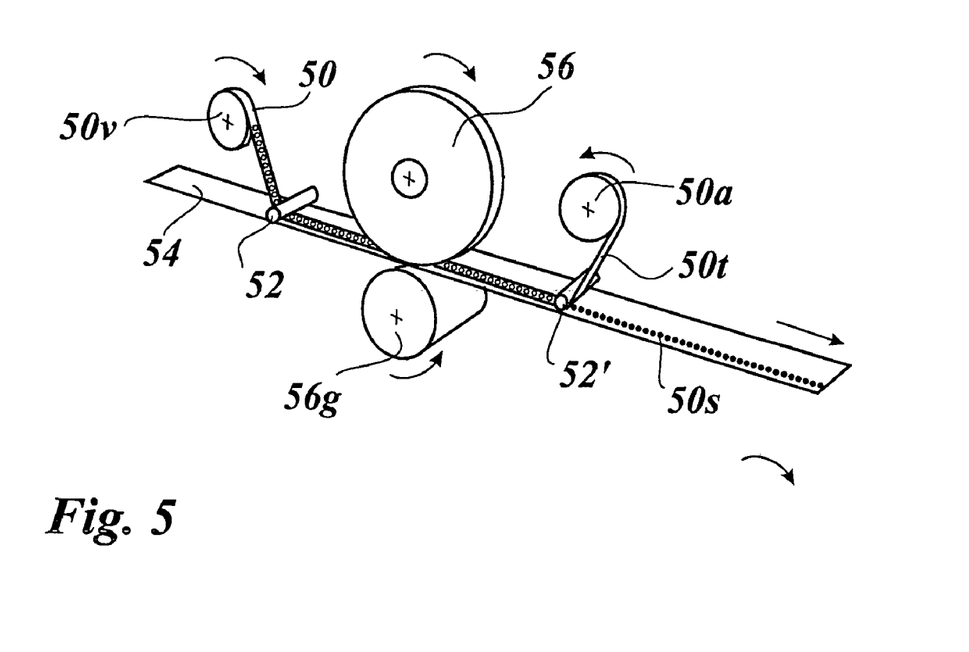
FIG. 5 shows a second embodiment for the application of the multi-layer body according to the invention.

FIG. 5 now shows a second embodiment for application of the multi-layer body according to the invention. A transfer film 50 with a carrier film 50t, a structure layer 50s and a hot adhesive layer (not shown) is wound on a supply roll 50v and applied to a carrier substrate 54 in band form by two pressure rollers 52 and 52' which are spaced from each other in the advance direction. A heated transfer roller 56 presses the transfer film 50 against a counterpressure roller 56, whereby the structure layer 50s is applied to the carrier substrate 54 by means of the hot adhesive. The carrier film 50t is pulled off the structure layer 50s and wound onto a roll 50a after the transfer film 50 together with the carrier substrate 54 has passed the pressure roller 52' arranged downstream of the transfer roller 56.

Figure 6:
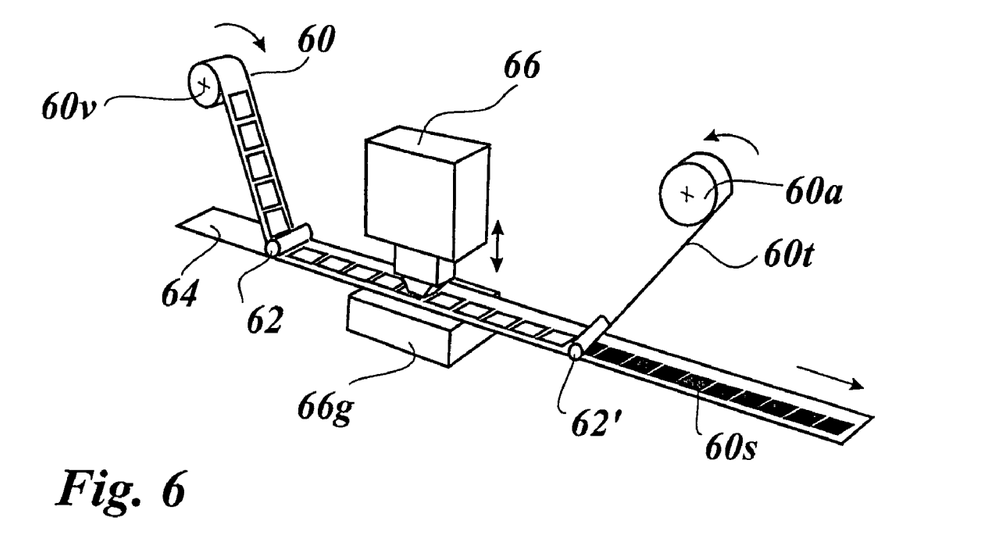
FIG. 6 shows a third embodiment for the application of the multi-layer body according to the invention.

FIG. 6 shows a third embodiment for application of the multi-layer body according to the invention. A transfer film 60 with a carrier film 60t, a structure layer 60s and a hot adhesive layer (not shown) is wound on a supply roll 60v and applied to a carrier substrate 64 in band form by two pressure rollers 62 and 62' arranged at a spacing from each other in the advance direction. The structure layer 60s is formed from portions which are arranged continuously at a spacing relative to each other on the carrier film 60t. A heated punch 66 presses the transfer film 60 against a counteracting holder 66g as soon as a portion of the structure layer 60s is disposed under the punch 66, whereby the portion of the structure layer 60s is applied to the carrier substrate 64 by means of the hot adhesive. The carrier film 60t is pulled off the structure layer 60s and wound onto a roll 60a after the transfer film 60 together with the carrier substrate 64 has passed the pressure roller 62' arranged downstream of the punch 66.

It can also be provided that the carrier substrate 64 is a carrier substrate in card form, for example a credit card or an identity card which is positioned under the punch 66 by a transport device. In that case the structure layer 60s can be an individualized security feature in the form of a logo with an alphanumeric print therein which has a relief structure which can be detected by touch at its surface.

The multi-layer body according to the invention can also play a crucial part only in an intermediate step in the production of a product. Three examples in which the relief structure 14o is covered in the end product by a medium are intended to make that clear.

In a first example a non-personalized pass is provided with a diffractive feature, for example with a patch, which is of the configuration shown in FIG. 2f. In the personalization operation which is effected for example by means of inkjet the microstructured relief structure 14o serves to ensure a good printed image and good adhesion of the printing ink to the structure layer 14. Following the personalization operation the entire data page of the pass is sealed with a structure layer transferred from a lamination film, as shown hereinbefore in FIGS. 4a through 4c.

A second example involves the formation of the edge region of a hot embossing film. The sharpness of the edge region is an important criterion in the transfer of the hot embossing film onto a substrate. For that purpose the layers of the transfer layer portion must appropriately break open. That breaking-open effect can now be influenced by a suitable relief structure 14o, for example by virtue of mechanical weakening. One of the advantages of the relief structure 14o is its flexibility and adaptability to the kind of application and the form of punch. If in a subsequent step the structure layer 14 is sealed, for example by a laminate with the optical refractive index of the structure layer 14, the relief structure 14o will not involve any perceptible optical effect.

A third example involves the orientation of liquid crystals by suitable surface structures. It can therefore be provided that, after the application of a multi-layer body the exposed relief structure 14o thereof is coated with an anisotropic polymer material over its full surface area or part thereof, for example by means of a printing process. Then the liquid crystals of the anisotropic polymer material are oriented if required with the application of heat to the relief structure serving as an orientation layer. Then, UV hardening or thermally induced radical crosslinking of the anisotropic polymer material is effected for fixing the orientation of the liquid crystals. The region which is printed upon with the liquid crystal layer, upon being examined with a polarizer, reveals additional information which can be seen in register relationship with the relief structure 14o.

The invention claimed is:

1. A transfer film which includes a carrier film and a transfer layer portion having a structure layer, the transfer layer portion being arranged on the carrier film and being detachable from the carrier film, wherein
the carrier film has a master relief structure on its side towards the structure layer, the structure layer on its side towards the carrier film has a first relief structure complementary to the master relief structure of the carrier film, the structure layer on its side remote from the carrier film has a second relief structure which differs from the first relief structure, and the second relief structure is covered at least region-wise with a reflection layer.

2. A transfer film as set forth in claim 1, wherein the structure layer is of a thickness of <5 µm, between the central levels of the two relief structures.

3. A transfer film as set forth in claim 1, wherein the master relief structure is formed by embossing in the carrier film or, wherein the carrier film has partial printing and the master relief structure is formed by means of the partial printing.

4. A transfer film as set forth in claim 1, wherein the carrier film has a replication lacquer layer in which the master relief structure is shaped.

5. A transfer film as set forth in claim 1, wherein a release layer is arranged between the carrier film and the transfer layer portion.

6. A transfer film as set forth in claim 1, wherein a protective layer is arranged on the side of the structure layer which is towards the carrier film.

7. A transfer film as set forth in claim 1, wherein the reflection layer is in the form of a metallic layer and/or is in the form of a dielectric layer, wherein the optical refractive index of the dielectric layer differs from the optical refractive index of the structure layer differs from the optical refractive index of the structure layer.

8. A transfer film as set forth in claim 1, wherein the first relief structure can be recognized by tactile means and/or by optical means.

9. A transfer film as set forth in claim 8, wherein the first relief structure and/or the second relief structure includes a microstructure.

10. A transfer film as set forth in claim 8, wherein the first relief structure and/or the second relief structure is or are in the form of a matt structure and/or in the form of a diffractive structure and/or in the form of a refractive structure and/or in the form of a macrostructure.

11. A transfer film as set forth in claim 1, wherein the first relief structure and the second relief structure produce mutually independent optical effects.

12. A transfer film as set forth in claim 1, wherein the first relief structure and the second relief structure produce mutually dependent optical effects.

13. A transfer film as set forth in claim 1, wherein the first relief structure partially has a reflection layer.

14. A multi-layer body manufactured by detaching the carrier film from the transfer layer portion from the transfer film defined in claim 1, the remaining transfer layer portion forming the multi-layer body comprising the structure layer, wherein the structure layer forms a front side of the multi-layer body and the first relief structure is shaped into a first surface of the structure layer, which forms the front side of the multi-layer body, and wherein
the second relief structure is shaped into a second surface in opposite relationship to the first surface of the structure layer, the second relief structure is different from the first relief structure, the second relief structure is covered at least region-wise by the reflection layer and the structure layer is of a thickness of <10 µm, between the central levels of the two relief structures.

15. A multi-layer body as set forth in claim 14, wherein the first relief structure is partially leveled off or flattened.

16. A multi-layer body as set forth in claim 14, wherein the first relief structure is partially overprinted.

17. A multi-layer body as set forth in claim 14, wherein the first relief structure has a region which can be detected by touch.

18. A multi-layer body as set forth in claim 17, wherein the region which can be detected by touch is arranged in register relationship with a structure arranged therebeneath.

19. A multi-layer body as set forth in claim 17, wherein the region which can be detected by touch is arranged in register relationship with an optically effective diffractive structure arranged therebeneath.

20. A security document having a multi-layer body as set forth in claim 14.

* * * * *